US010560264B2

United States Patent
Hassan et al.

(10) Patent No.: US 10,560,264 B2
(45) Date of Patent: *Feb. 11, 2020

(54) CRYPTOGRAPHIC KEY CREATION USING OPTICAL PARAMETERS

(71) Applicant: Microsoft Technology Licensing, LLC, Redmond, WA (US)

(72) Inventors: Amer A. Hassan, Kirkland, WA (US); Roy Kuntz, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/991,633

(22) Filed: May 29, 2018

(65) Prior Publication Data
US 2019/0044712 A1 Feb. 7, 2019

Related U.S. Application Data

(63) Continuation-in-part of application No. 15/346,689, filed on Nov. 8, 2016.

(51) Int. Cl.
*H04L 9/00* (2006.01)
*H04L 9/08* (2006.01)
(Continued)

(52) U.S. Cl.
CPC .......... *H04L 9/0852* (2013.01); *H04B 10/40* (2013.01); *H04B 10/801* (2013.01); *H04L 9/001* (2013.01);
(Continued)

(58) Field of Classification Search
CPC . H04L 9/0875; H04L 9/0861; H04L 25/0212; H04L 25/0202; H04L 9/0866;
(Continued)

(56) References Cited

U.S. PATENT DOCUMENTS

| 5,241,597 A | 8/1993 | Bright |
| 5,594,797 A | 1/1997 | Alan ar a et al. |

(Continued)

FOREIGN PATENT DOCUMENTS

| CN | 103167490 A | 6/2013 |
| CN | 104584670 A | 4/2015 |

(Continued)

OTHER PUBLICATIONS

"Non Final Office Action Issued in U.S. Appl. No. 15/206,142", dated Apr. 4, 2018, 15 Pages.

(Continued)

*Primary Examiner* — Mohammad W Reza
(74) *Attorney, Agent, or Firm* — Schwegman Lundberg & Woessner, P.A.

(57) ABSTRACT

A cryptographic key generator for a first optical transceiver includes a photodetector that receives a continuous wave light beam received via an optical channel from a second optical transceiver. The generator samples and quantizes signals from the photodetector during a plurality of intervals to generate respective samples representing respective numbers of photons incident on the photodetector during each of the plurality of intervals. The generator creates a first cryptographic key from the plurality of digital values. The second optical transceiver receives a continuous wave light beam from the first transceiver and performs the same functions to create a second cryptographic key. Due to the reciprocal nature of the channels, the first and second cryptographic keys match.

20 Claims, 7 Drawing Sheets

(51) Int. Cl.
  *H04B 10/80* (2013.01)
  *H04B 10/40* (2013.01)
  *H04L 9/12* (2006.01)
  *H04L 29/06* (2006.01)
  *H04W 12/00* (2009.01)
  *H04L 9/06* (2006.01)
  *G02F 7/00* (2006.01)

(52) U.S. Cl.
  CPC .......... *H04L 9/0662* (2013.01); *H04L 9/0866* (2013.01); *H04L 9/0875* (2013.01); *H04L 9/12* (2013.01); *H04L 63/06* (2013.01); *H04L 63/061* (2013.01); *H04L 63/18* (2013.01); *H04W 12/003* (2019.01); *G02F 7/00* (2013.01); *H04L 2209/34* (2013.01); *H04L 2209/80* (2013.01); *H04L 2463/081* (2013.01); *H04W 12/00504* (2019.01)

(58) Field of Classification Search
  CPC ....... H04L 9/14; H04L 63/06; H04L 63/0428; H04L 2209/80; H04L 2209/24; H04W 12/04
  USPC .......................................................... 380/44
  See application file for complete search history.

(56) References Cited

U.S. PATENT DOCUMENTS

| | | | |
|---|---|---|---|
| 5,604,806 | A | 2/1997 | Hassan et al. |
| 6,031,913 | A | 2/2000 | Hassan et al. |
| 6,173,005 | B1 | 1/2001 | Kotzin et al. |
| 6,307,882 | B1 | 10/2001 | Marzetta |
| 7,167,562 | B2 | 1/2007 | Milgram |
| 7,171,552 | B1 | 1/2007 | Bell |
| 7,263,140 | B2 | 8/2007 | Henttu |
| 7,418,596 | B1 | 8/2008 | Carroll et al. |
| 7,421,075 | B2 | 9/2008 | Hassan et al. |
| 7,634,088 | B2 | 12/2009 | Sasaoka et al. |
| 7,783,879 | B2 | 8/2010 | Krummel et al. |
| 7,949,032 | B1 | 5/2011 | Frost |
| 8,270,602 | B1 | 9/2012 | Forman et al. |
| 8,873,755 | B2 | 10/2014 | Mathur et al. |
| 8,909,194 | B2 | 12/2014 | Madhavan et al. |
| 8,964,986 | B2 | 2/2015 | Tahan et al. |
| 9,008,208 | B2 | 4/2015 | Khandani |
| 9,031,236 | B2 | 5/2015 | Donnangelo et al. |
| 9,042,544 | B2 | 5/2015 | Baek et al. |
| 9,130,693 | B2 | 9/2015 | Reznik et al. |
| 9,319,877 | B2 | 4/2016 | Ando |
| 2002/0158211 | A1* | 10/2002 | Gillispie ............... G01J 3/4406 250/458.1 |
| 2005/0244000 | A1 | 11/2005 | Coleman |
| 2006/0198520 | A1 | 9/2006 | Courtney et al. |
| 2007/0036353 | A1 | 2/2007 | Reznik et al. |
| 2007/0058808 | A1 | 3/2007 | Rudolf et al. |
| 2007/0165845 | A1* | 7/2007 | Ye ........................ H04L 63/061 380/30 |
| 2007/0291682 | A1 | 12/2007 | Anjum |
| 2009/0225982 | A1* | 9/2009 | Yener ..................... H04L 63/06 380/44 |
| 2009/0279700 | A1 | 11/2009 | Ye et al. |
| 2010/0085160 | A1 | 4/2010 | Fu |
| 2010/0135498 | A1 | 6/2010 | Long et al. |
| 2011/0130119 | A1 | 6/2011 | Gupta et al. |
| 2012/0159147 | A1 | 6/2012 | Ando |
| 2013/0077789 | A1 | 3/2013 | Tahan et al. |
| 2013/0236007 | A1 | 9/2013 | Munro et al. |
| 2013/0243187 | A1 | 9/2013 | Horstmeyer et al. |
| 2015/0048977 | A1 | 2/2015 | Khandani |
| 2015/0063566 | A1 | 3/2015 | Arakawa et al. |
| 2015/0382187 | A1 | 12/2015 | Kruglick |
| 2016/0050219 | A1 | 2/2016 | Niewczas et al. |
| 2016/0055428 | A1 | 2/2016 | Raina et al. |
| 2016/0234008 | A1 | 8/2016 | Hekstra et al. |
| 2017/0289921 | A1 | 10/2017 | Kim et al. |
| 2018/0013553 | A1 | 1/2018 | Hassan |
| 2018/0013558 | A1 | 1/2018 | Hassan |
| 2018/0013559 | A1 | 1/2018 | Hassan |

FOREIGN PATENT DOCUMENTS

| | | |
|---|---|---|
| WO | 0209344 A1 | 1/2001 |
| WO | 0154053 A1 | 7/2001 |
| WO | 2006130725 A2 | 12/2006 |

OTHER PUBLICATIONS

"Non Final Office Action Issued in U.S. Appl. No. 15/275,207", dated Apr. 19, 2018, 13 Pages.
"Non Final Office Action Issued in U.S. Appl. No. 15/346,689", dated May 18, 2018, 14 Pages.
Croft, Jessica Erin Dudley, "Shared Secret Key Establishment Using Wireless Channel Measurements", In Doctoral Dissertation of the University of Utah, Jul. 2011, 124 Pages.
Forman, et al., "A Generalized Scheme for the Creation of Shared Secret Keys through Uncorrelated Reciprocal Channels in Multiple Domains", In Proceedings of 18th International Conference on Computer Communications and Networks, Aug. 3, 2009, 8 Pages.
Ohira, Takashi, "Secret Key Generation Exploiting Antenna Beam Steering and Wave Propagation Reciprocity", In Proceedings of European Microwave Conference, vol. 1, Oct. 4, 2005, 4 Pages.
Patwari, et al., "High-Rate Uncorrelated Bit Extraction for Shared Secret Key Generation from Channel Measurements", In Journal of IEEE Transactions on Mobile Computing, vol. 9, No. 1, Jan. 2010, 14 Pages.
"International Search Report and written opinion Issued in PCT Application No. PCT/US17/040561", dated Sep. 27, 2017, 12 Pages.
"International Search Report and Written Opinion Issued in PCT Application No. PCT/US17/040568", dated Dec. 20, 2017, 14 Pages.
Ren, et al., "Secret key generation exploiting channel characteristics in wireless communications", In Journal of IEEE Wireless Communications, vol. 18, Issue 4, Aug. 2011, pp. 6-12.
Wilson, et al., "Channel Identification: Secret Sharing Using Reciprocity in Ultrawideband Channels", In Proceedings of IEEE Transactions on Information Forensics and Security, vol. 2, No. 3, Sep. 2007, pp. 364-375.
Ye, Chunxuan, "Information Theoretic Generation of Multiple Secret Keys", In Thesis Submitted to Department of Electrical and Computer Engineering and Institute for System Research, Sep. 1, 2016, 156 Pages.
"Non Final Office Action Issued in U.S. Appl. No. 15/206,142", dated Dec. 27, 2018, 17 Pages.
"Non Final Office Action Issued in U.S. Appl. No. 15/275,207", dated Jan. 18, 2019, 21 Pages.
"Final Office Action Issued in U.S. Appl. No. 15/346,689", dated Jan. 11, 2019, 13 Pages.
Aono, "Wireless Secret Key Generation Exploiting Reactance-Domain Scalar Response of Multipath Fading Channel", In proceedings of IEEE Transactions on Antennas and Propagation, vol. 53, No. 11, Nov. 2005, pp. 3776-3783.
"Final Office Action Issued in U.S. Appl. No. 15/206,142", dated Aug. 6, 2018, 18 Pages.
"Final Office Action Issued in U.S. Appl. No. 15/275,207", dated Aug. 23, 2018, 19 Pages.
Kravtsov, et al., "Physical layer secret key generation for fiber-optical networks", In Optics express, vol. 21, Issue 20, Sep. 30, 2013, pp. 23756-23771.
"International Search Report and Written Opinion Issued in PCT Application No. PCT/US19/032081", dated Jul. 24, 2019, 13 Pages.

* cited by examiner

CRYPTOGRAPHIC KEY CREATION USING OPTICAL PARAMETERS

CROSS-REFERENCE TO RELATED APPLICATION

This application is a continuation-in-part application of U.S. application Ser. No. 15/346,689, filed on Nov. 8, 2016, the disclosure of which is expressly incorporated herein by reference in its entirety.

BACKGROUND

Many cryptography methods employ key servers or otherwise exchange encryption keys among multiple devices. Other devices generate and exchange keys or partial keys among two or more devices. Obtaining cryptographic keys from servers or exchanging keys risks interception of the keys and, thus, malicious decryption of data encrypted with the keys. Effective cryptographic key distribution is an important element of a secure communication system. While current methods can ensure effective key distribution in many instances, they are still vulnerable to attack.

SUMMARY

This summary is not an extensive overview of the claimed subject matter. It is intended to neither identify key elements of the claimed subject matter nor delineate the scope of the claimed subject matter. Its sole purpose is to present some concepts of the claimed subject matter in a simplified form as a prelude to the more detailed description that is presented later.

According to one aspect, first optical transceiver receives, at a first photodetector, a first continuous wave optical beam from a second optical transceiver via an optical channel. The first optical transceiver samples and digitizes signals from the first photodetector representing photons incident on the photodetector during each of a first plurality of intervals. The first optical transceiver creates a cryptographic key from the digitized samples.

According to another aspect, the first optical transceiver further includes a light source configured to produce a second light beam and an optical coupler configured to selectively direct the second light beam from the light source to the optical channel and to direct the first light beam from the optical channel to the photodetector. The optical coupler is configured to direct the first light beam from the optical channel to the photodetector during the first plurality of intervals and to direct the second light beam from the light source to the optical channel during a second plurality of intervals, different from the first plurality of intervals, resulting in creation of a matching cryptographic key by the second optical transceiver.

The following description and the annexed drawings set forth in detail certain illustrative aspects of the claimed subject matter. These aspects are indicative, however, of a few of the various ways in which the principles of the claimed subject matter may be employed and the claimed subject matter is intended to include all such aspects and their equivalents. Other advantages and novel features of the claimed subject matter will become apparent from the following detailed description when considered in conjunction with the drawings.

DETAILED DESCRIPTION

The disclosed embodiments describe methods by which two optical transceivers connected by a common optical channel can independently create matching cryptographic keys while exchanging little or no information about the keys. These embodiments provide a technical advantage in that two optical transceivers may create matching keys, and use the keys to encrypt and decrypt data for secure communications on a channel between the two optical transceivers without exchanging keys or key related information over any channel. The example embodiments provide another advantage in that the communicating optical transceivers may determine the keys immediately before initiating the encrypted communication.

The optical channel between two optical transceivers is reciprocal; optical beams sent from the first optical transceiver to the second optical transceiver and from the second optical transceiver to the first optical transceiver experience essentially the same channel characteristics. Photons from a continuous wave light source sent through one end of an optical channel are received and sensed at the other end of the optical channel according to a Poisson distribution. The Poisson distribution may be approximated by a Gaussian distribution having a mean, $\lambda$, corresponding to the average number of photons sensed during the predetermined interval. In this approximation, the variance of the Gaussian distribution is also $\lambda$. The value of $\lambda$ depends on the characteristics of the light source, optical channel, and detector. Thus, when similar equipment is used on both sides of the optical channel, each optical transceiver senses similar average numbers of photons during the predetermined interval with similar variances. The variations in the numbers of photons may be captured and converted into a cryptographic key by both optical transceivers. Due to the reciprocal nature of the optical channel the two optical transceivers receive similar numbers of photons during corresponding intervals. Each optical transceiver may then use its cryptographic key to encrypt data to send to the other optical transceiver and decrypt data received from the other optical transceiver. Although the embodiments described below utilize one or more optical fibers in the optical channel, it is contemplated that any type of optical waveguide (e.g. formed from glass, crystal, or a semiconductor) may be used in the optical channel. Alternatively or in addition, it is contemplated that each optical transceiver may direct a collimated light beam through an intervening medium (e.g., air, water, vacuum or other medium) onto the other optical transceiver. In this instance the optical channel may include the medium between the two optical transceivers.

Because the numbers of photons sensed during each predetermined interval depends on the characteristics of the two optical transceivers and the optical channel connecting the optical transceivers, only the two optical transceivers may be subject to these characteristics. A third optical transceiver that attempts to intercept communications, for example via an optical coupler evanescently coupled to the optical channel, will not be able to create the key or decode the communications because the photons sensed by the third party will be governed by a different Poisson distribution. The third optical transceiver cannot intercept the keys or key information because the cryptographic key or information about the cryptographic key is not exchanged on any channel. The embodiments also provide an advantage in that the keys created in each of two optical transceivers may be updated as appropriate to provide additional security. Because the keys are created based on the current characteristics of the respective light sources, optical channel and photodetectors, cryptographic keys created at different times may be subject to different characteristics (e.g. heat effects) so that each new key is likely to be different from the previously created key.

The created cryptographic keys may be used, for example, in a symmetric encryption algorithm such as, without limitation, data encryption standard (DES), triple DES, Blowfish, advanced encryption standard (AES), Rivest Cipher 4 (RC4), RC5, or RC6 to encrypt and/or decrypt data.

As a preliminary matter, some of the figures describe concepts in the context of one or more structural components, variously referred to as functionality, modules, features, elements, or the like. The various components shown in the figures can be implemented in any manner, such as software, hardware, firmware, or combinations thereof. In some cases, various components shown in the figures may reflect the use of corresponding components in an actual implementation. In other cases, any single component illustrated in the figures may be implemented by a number of actual components. The depiction of any two or more separate components in the figures may reflect different functions performed by a single actual component.

Other figures describe the concepts in flowchart form. In this form, certain operations are described as constituting distinct blocks performed in a certain order. Such implementations are examples and non-limiting. Certain blocks described herein can be grouped together and performed in a single operation, certain blocks can be broken apart into multiple component blocks, and certain blocks can be performed in an order that differs from that which is illustrated herein, including a parallel manner of performing the blocks. The blocks shown in the flowcharts can be implemented by software, hardware, firmware, manual processing, or the like. As used herein, hardware may include microprocessors, digital signal processors (DSPs), microcontrollers, computer systems, discrete logic components, and/or custom logic components such as field programmable gate arrays (FPGAs), application specific integrated circuits (ASICs), programmable logic arrays (PLAs) or the like.

As to terminology, the phrase "configured to" encompasses any way that any kind of functionality can be constructed to perform an identified operation. The functionality can be configured to perform an operation using, for example, software, hardware, firmware, or the like. For example, the phrase "configured to" can refer to a logic circuit structure of a hardware element that is arranged to implement the associated functionality. The phrase "configured to" can also refer to a logic circuit structure of a hardware element that is arranged to implement the coding design of associated functionality of firmware or software. The term "module" refers to a structural element that can be implemented using any suitable hardware (e.g., a processor, among others), software (e.g., an application, among others), firmware, and/or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system which may include a single-core or multi-core microprocessor, a microcontroller and/or a digital signal processor (DSP).

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any non-transitory computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Figure 1A:
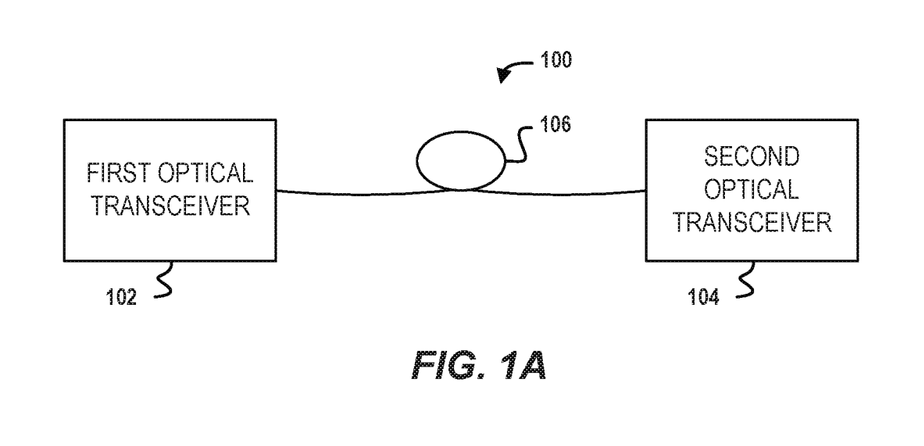
FIGS. 1A and 1B are block diagrams of example optical networks.
Figure 1B:
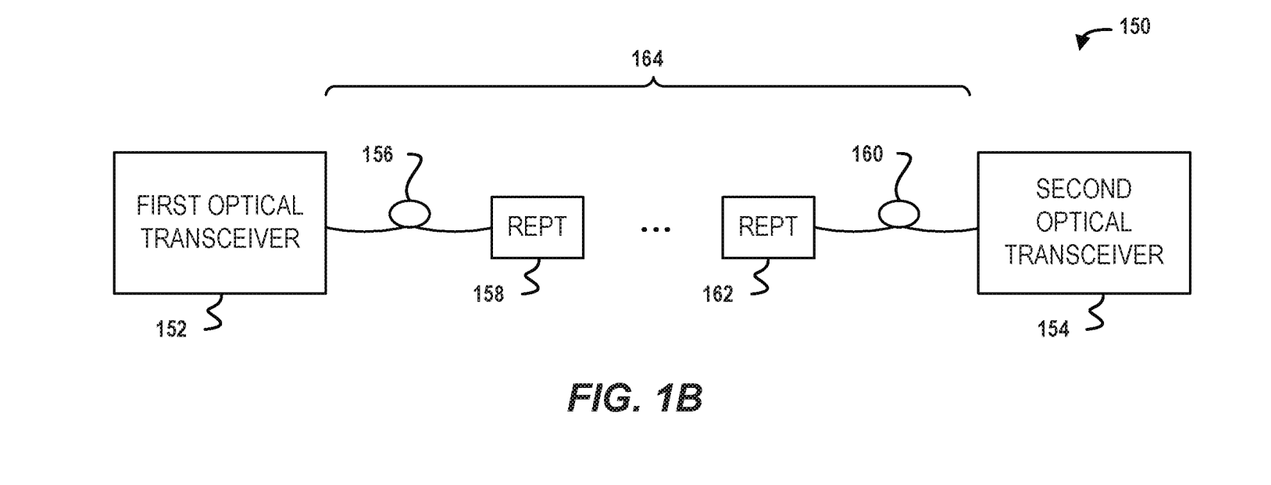

FIG. 1A is a block diagram of a simple optical communication network 100 in which two optical transceivers, 102 and 104 communicate via a connecting optical channel 106 that includes an optical fiber. The optical fiber that forms the example optical channel 106 is selected so that the devices may implement half-duplex and/or full-duplex communications. FIG. 1B is block diagram showing another optical communication network 150. In this optical network two optical transceivers 152 and 154 communicate through an optical channel that includes multiple optical fibers (e.g. 156 and 160) and multiple repeaters (e.g. 158 and 162) coupling the optical fibers. The repeaters 158 and 162 may, for example, filter and amplify the optical fiber to increase signal strength while removing out-of-band noise.

Figure 2:
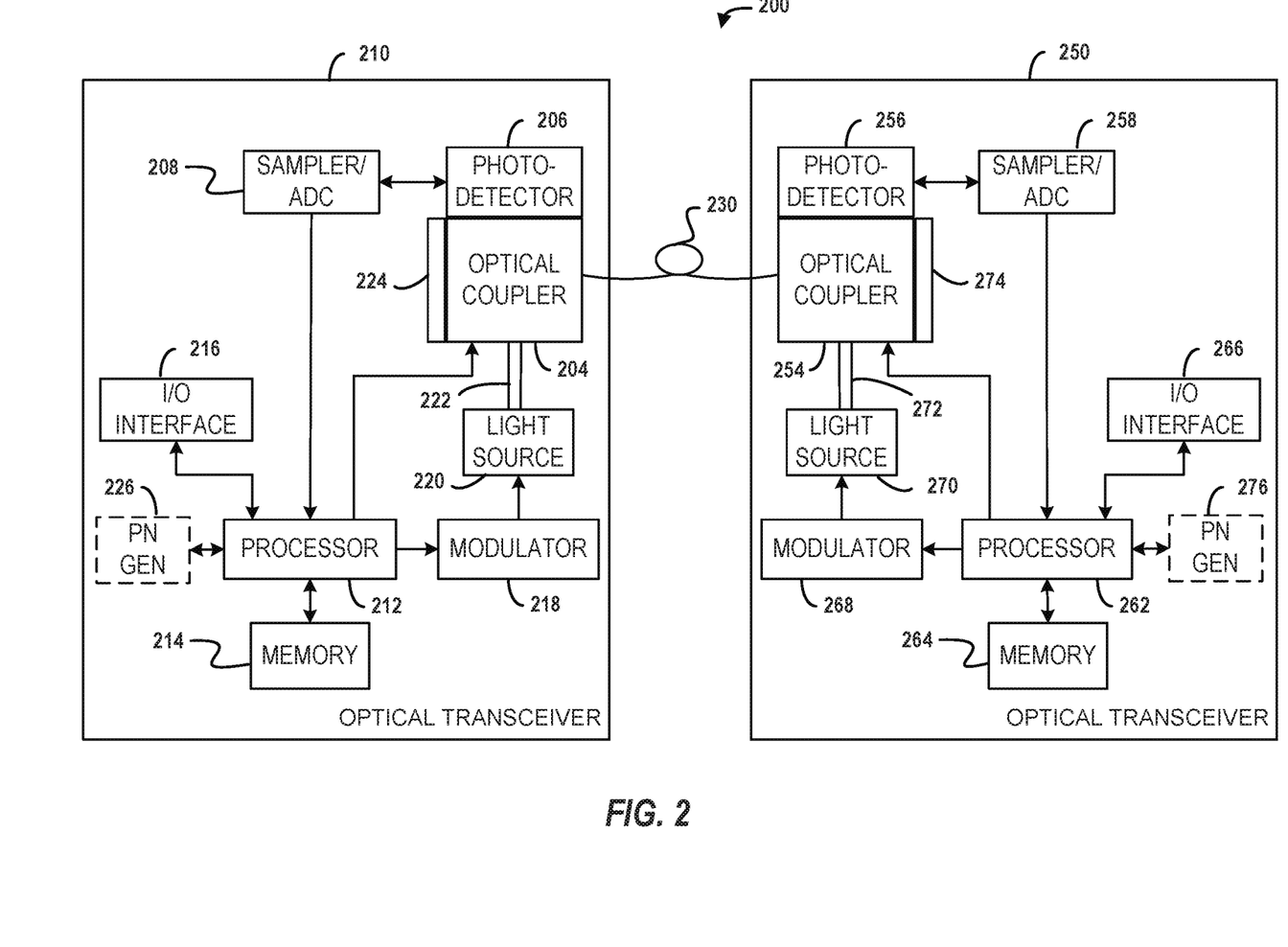
FIG. 2 is a block diagram of an optical network showing details of two example optical transceivers.

FIG. 2 is a block diagram showing details of two optical transceivers 210 and 250 coupled by an optical channel 230. Optical transceiver 210, for example, includes an optical coupler 204, a photodetector 206, a sampler/analog-to-digital converter (ADC) 208, a processor 212, a memory 214, an input/output (I/O) interface 216, a modulator 218, a light source 230, a mirror 224, and an optional pseudorandom number (PN) generator 226. The light source 220 generates a collimated beam 222. Similarly, example optical transceiver 250 includes an optical coupler 254, a photodetector 256, a sampler/ADC 258, a processor 262, a memory 264, an I/O interface 266, a modulator 268, a light source 270, a mirror 274, and an optional pseudorandom number (PN) generator 276. The light source 270 generates a collimated beam 272. The elements of the optical transceiver 250 operate in the same way as the corresponding elements of the optical transceiver 210. The memories 214 and 264 may hold program instructions for the respective processors 212 and 216 and may also hold data used in the key creation as described below. The following materials describe the operation of the elements of the transceiver 210. This description also applies to the corresponding elements of the optical transceiver 250.

Each of the light sources 220 and 270 shown in the example of FIG. 2 may include a semiconductor laser or a light-emitting diode (LED) coupled to a collimating lens (not shown). The light sources may operate in one or more of the infrared (IR), visible, or ultraviolet (UV) spectrum wavelength bands. The photodetectors 206 and 256 may include, for example, photodiodes, phototransistors, or photo-resistors and may also include a microscope objective (not shown) configured to focus light from the optical coupler 204 or 254 on the photodetector 206 or 256. To provide reciprocity between the optical transceivers 210 and 250, it is desirable for the light sources 220 and 270, the photodetectors 206 and 256, and optical couplers 204 and 254 of the two optical transceivers to match. As described below, the light sources 220 and 270 and photodetectors 206 and 256 may be any such optical transceiver as long as they have similar characteristics. Indeed, it may be advantageous to use relatively low-quality devices as these devices tend to exhibit greater variability in their steady-state operations than higher-quality devices. This greater variability may result in successive cryptographic keys having greater differences, and, thus, may enhance the security of data encrypted using multiple successive cryptographic keys.

Although the examples are described as using a solid-state light source with electrical modulation, it is contemplated that other types of light sources, such as a gas laser, a chemical laser or a dye laser may be used, and/or that the beam provided by the light source may be modulated using an optical modulator such as an electro-optic modulator (EOM) (not shown) configured between the light source 220 or 270 and the optical coupler 204 or 254, respectively.

In optical transceiver 210, the example optical coupler 204 is controlled by the processor 212 to direct a light beam from the optical channel 230 to the photodetector 206 or to the mirror 224 and/or to direct the light beam 222 from the light source 220 to the optical channel 230. In some embodiments, the optical coupler may be implemented as a digital micro-mirror (DMM) device which pivots among three positions. In the orientation shown in FIG. 2, these positions are a 135 degree angle with respect to the axis of the optical channel 230 to direct light from the channel 230 to the photodetector 206, a 315 degree angle to direct the light beam 222 to the optical channel, and a 90 degree angle to reflect the light beam provided by the optical channel 230 back to the optical channel 230. In these embodiments, the DMM device may be internal to the optical coupler 204 and may function as the mirror 224.

Alternatively, the optical coupler may include a beam splitter or one or more light guides positioned between the optical channel 230 and the photodetector 206, mirror 224 and light source 220. The optical coupler may also include respective light valves (e.g., LCD or mechanical shutters) that may be controlled to selectively pass or block respective optical paths between the optical channel 230 and each of the photodetector 206, mirror 334 and light source 220. This second configuration may be used to implement a full-duplex channel between the optical transceivers 210 and 250.

The example photodetector 206 produces an electrical signal proportional to the optical power of the beam from the optical channel 230. The optical power of the beam on the photodetector 206, in turn, is related to number of photons incident on the photodetector 206 during a sampling interval. The number of photons incident on the photodetector 206 during the sampling interval is governed by a Poisson distribution which may be modeled by a Gaussian distribution having a mean number of photons per sampling interval and variance corresponding to the mean. The embodiments described below assume that the optical beams received by the optical transceivers 210 and 250 operate according to similar Poisson distributions.

Example implementations of the embodiments also provide advantages in that the implementations may be used in networks or systems having optical transceivers using relatively low quality light sources and photodetectors. In these networks, however, the sampled and quantized light signal received by one optical transceiver may have one or more symbol differences compared to the sampled and quantized light signal received by the other optical transceiver. Thus, cryptographic keys created directly from the sampled and quantized signals may not be identical in the two optical transceivers. The sampled and quantized signals, for example, may exhibit low-level variations due to thermal noise. In some embodiments, the quantized samples may be further processed to generate symbols including only the selected bits of the quantized samples. Furthermore, zero-valued symbols may be ignored. The generated symbols correspond to photons of the continuous wave optical signal incident on the photodetector during the selected intervals. As described above, the numbers of photons detected by the photodetector follows a Poisson distribution and is determined, at least in part, by characteristics of the optical channel.

Example systems may also convert non-identical keys having a relatively small number of differences into identical keys by applying the quantized samples to an ECC decoder, such as a Reed-Solomon decoder. In these embodiments, the decoder may implement a many-to-one mapping by which multiple symbol sequences map into a common cryptographic key. Thus, symbol sequences generated from two sampled signals received by different optical transceivers and having a relatively small number of differently quantized values may map into a common cryptographic key. The number of symbol differences that can be mapped into the same value depends on the Hamming distance of the particular ECC. As described above, an ECC decoder having a sufficiently large Hamming distance may be used to map the sampled sequences to common keys that may be used with the encryption algorithm. As described below, the FCC used by these embodiments depends on the type and length of the cryptographic key to be created.

For key creation using the embodiment shown in FIG. 2, the optical transceivers 210 and 250 are concurrently placed in a key creation mode. This may be accomplished, for example, using a non-encrypted communication between the two devices. In an example key creation mode, each optical transceiver 210 and 250 may be allocated a predetermined amount of time to receive a continuous wave optical signal from the other transceiver in order to create the cryptographic key. In one example embodiment, the optical coupler 204 of the optical transceiver 201 is initially controlled by the processor 212 to direct the light beam from the optical channel 230 to the photodetector 206 while the optical transceiver 250 transmits an unmodulated continuous wave optical signal through the optical channel 230. In this interval, the photodetector 206 accumulates incident photons to generate an electric charge which is then sampled by the sampler/ADC 208. In an example embodiment, the sampler/ADC 208 samples the accumulated charge on the photodetector 206 after an accumulation interval of between 1 ns and 50 ns. In some embodiments, the ADC of the sampler/ADC 208 may generate 10-bit to 20-bit sample values at a rate of between $10^6$ and $10^7$ samples per second. Thus the sampler of the sampler/ADC 208 may operate at a higher rate than the ADC of the sampler/ADC 208. In particular, the sampler may obtain a sample integrated by the photodetector 206 during the period of between 100 ns and 50 ns, reset the photodetector 206, and hold the sample for a period of between 100 ns and 1 ms for digitizing by the ADC. After digitizing a sample, the sampler allows the photodetector to accumulate charge for another sampling interval and, at the end of the interval, captures and digitizes the next value. Output quantized samples from the sampler/ADC 208 are applied to the processor 212 which creates or generates the cryptographic key, as described below. The generated cryptographic key may be stored in the memory 214. The optical transceiver 250 uses the same process to create a cryptographic key which, due to the channel symmetry, is desirably the same as the cryptographic key created by the optical transceiver 210.

The optical transceiver 250 creates its cryptographic key before, during or after the creation of the cryptographic key by the optical transceiver 210. The creation of the cryptographic key by the optical transceiver 250 is similar to the creation by the optical transceiver 210 and is described briefly below. At a time agreed between optical transceiver 210 and optical transceiver 250, the optical transceiver 210 directs an unmodulated continuous wave light beam 222 from the light source 220 through the optical coupler to the optical channel 230. The optical coupler 254 of the optical transceiver 250 is configured by the processor 262 to direct the light beam from the optical channel 230 to the photodetector 256. The electrical charge on the photodetector 256 is sampled and digitized by the sampler/ADC 258 to generate a sequence of quantized samples provided to the processor 262. The processor 262 converts the sequence of values to a cryptographic key which is stored in the memory 264.

The pseudorandom number generators 226 and 276 shown in FIG. 2 may be used, as described below, to adjust the power level of continuous wave beam provided by the respective optical transceivers 210 and 250 during cryptographic key creation.

After both of the optical transceivers 210 and 250 have created cryptographic keys, optical transceiver 210 may encrypt and send a known data stream to the optical transceiver 250. If optical transceiver 250 can decrypt the known data stream using its cryptographic key, optical transceiver 250 may send an encrypted or unencrypted acknowledgement signal to the optical transceiver 210 indicating that both keys match. Alternatively, each optical transceiver may encrypt and send the known data to the other optical transceiver and, upon successful decoding, store and begin to use the created cryptographic key without sending an acknowledgement signal. If optical transceiver 250 cannot decrypt the data stream then the two keys do not match and both optical transceivers 210 and 250 restart the process of generating their respective cryptographic keys.

In optical transceiver 210, the processor 212 may use the cryptographic key to encrypt data provided via the I/O interface 216. The encrypted data may then be applied to the modulator 218 which modulates the light source 220 to generate the optical beam 222. To transmit the encrypted data on the optical beam 222 to the optical transceiver 250, the processor 212 controls the optical coupler 204 to direct the optical beam 222 to the optical channel 230. In optical transceiver 250, the processor 262 encrypts data provided via the I/O interface 266 with the cryptographic key and provides the encrypted data to the modulator 268. Modulator 268 controls the light source 270 to provide a modulated light beam 272 to the optical coupler 254, which is controlled by the processor 262 to direct the modulated light beam to the optical channel 230 for transmission to the optical transceiver 210.

Both of the optical transceivers 210 and 250 create the cryptographic key before exchanging encrypted data. The keys may be created sequentially such that one optical transceiver 210 or 250 creates the cryptographic key before the other optical transceiver 250 or 210. Alternatively, both optical transceivers may create the key concurrently such that optical transceiver 210 generates and sends a continuous wave optical signal to optical transceiver 250 while optical transceiver 250 generates and sends the continuous wave optical signal to optical transceiver 210. These signals may be sent simultaneously (full duplex) or may be interleaved such that optical transceiver 210 receives N quantized samples followed by optical transceiver 250 receiving N quantized samples until both optical transceivers have generated M symbols used to create the cryptographic key.

Figure 3A:
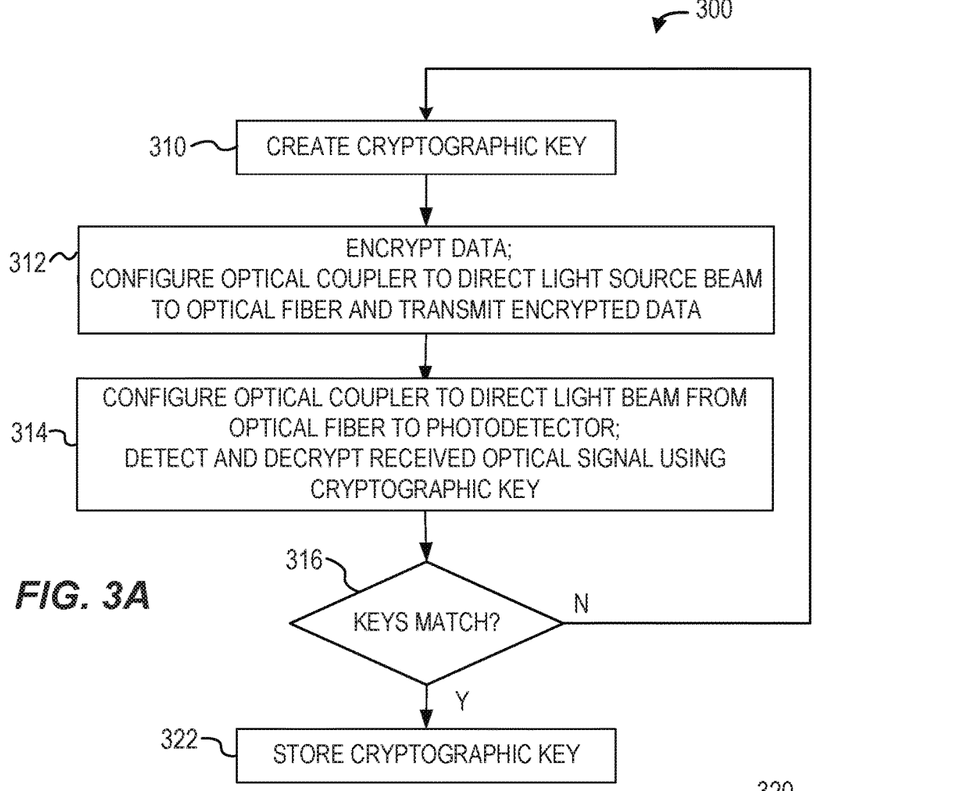
FIG. 3A is a flow-chart diagram showing the operation of an example key generator that may be used in the network shown in FIG. 1A.

As described above, because the two optical transceivers 210 and 250 create their cryptographic keys independently, the keys may or may not match. FIG. 3A is a flowchart diagram an example cryptographic key creation process 300 implemented by the optical transceivers 210 and 250, according to example embodiments, to achieve matched keys. FIG. 3A is described in the context of optical transceiver 210. The same operations, however, apply to optical transceiver 250.

At block 310, the optical transceiver 210 creates the cryptographic key. Example processes for generating the cryptographic key is described below with reference to FIGS. 3B, 3C, 4A, 4B, and 5. At block 312, after generating the key, the processor 212 of the optical transceiver 210 encrypts a known data set with the created cryptographic key and transmits the encrypted data set to the optical transceiver 250. The processor 212, using the modulator 218, modulates the light source 220 with the encrypted data set while controlling the optical coupler 204 to direct the light beam 222 to the optical channel 230. The modulated light beam containing the encrypted data is transmitted to the optical transceiver 250 via the optical channel 230. Next, at block 314, the processor 212 configures the optical coupler 204 to direct the light beam from the optical channel 230 to the photodetector 206. The optical transceiver 210 then receives, quantizes, and samples the received optical signal. If the optical transceiver 250 successfully decrypted the data set, the received signal may be an acknowledgement. Alternatively, the received signal may be the known data set encrypted and transmitted by the optical transceiver 250. In this instance, the processor 212 of the optical transceiver 210 applies the cryptographic key to decode the sampled data signal and compares the result to the known data set to determine if the decryption was successful.

When the receiving optical transceiver receives the acknowledgement signal or is able to decrypt the known data then the cryptographic keys match. At block 316, if the cryptographic keys do not match, control transfers to block 310 to restart the process of generating the cryptographic key. When, at block 316, it is determined that the cryptographic keys match, block 322 stores cryptographic key in the memory 214 for use in encrypting data received via the I/O interface 216 and for decrypting data received from optical transceiver 250 via the optical channel 230.

FIGS. 3B, 3C, 4A, 4B and 5 are flowchart diagrams that describe examples of the process of block 310 for generating the cryptographic key. The creation of the cryptographic key by the two optical transceivers 210 and 250 may be synchronized according a protocol known to both of the transceivers 210 and 250 or communicated between the transceivers 210 and 250 prior to generating the cryptographic key. Alternatively, the optical transceivers 210 and 250 may be synchronized based on a common received signal, for example from GPS receivers (not shown) in each of the transceivers 210 and 250. This protocol may also include data to synchronize clock signals in the two optical transceivers to enable each of the transceivers to transmit and receive the continuous wave optical signals during intervals in which the other transceiver receives and transmits the continuous wave optical signals, respectively. FIG. 3A describes a basic process of generating the cryptographic key that may include two optional elements. The first optional element, at block 324, concerns changing the power level of the continuous wave beam sent and received during the creation of the cryptographic keys. The second optional element, at block 328, concerns selecting only symbols having magnitudes greater than a threshold in order to reduce the effects of low-level noise.

Figure 3B:
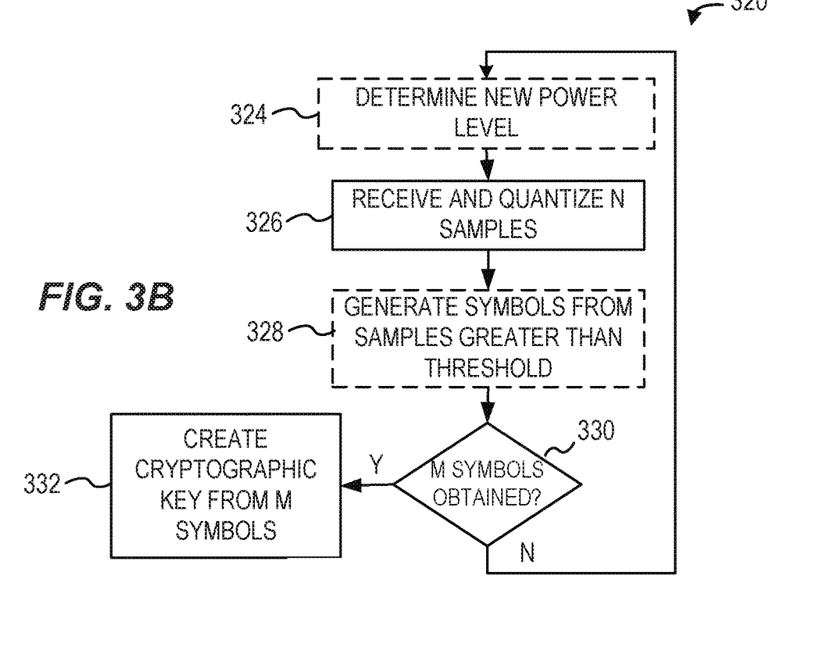
FIGS. 3B and 3C are flow-chart diagrams showing details of the flow-chart diagram in FIG. 3A.

With respect to using different power levels, although the light beam incident on the photodetector 206 during key generation is an unmodulated continuous wave signal, depending on the protocol implemented between optical transceiver 210 and 250, the optical signal may have different power levels at different times. This may be advantageous for the creation of the cryptographic key, because the optical signal may have different means and variances at the different power levels and, thus, produce different sampled and quantized symbols. In one embodiment, the power level used at a particular time is determined responsive to a pseudorandom number (PN) generator 226. In this embodiment, both optical transceiver 210 and optical transceiver 250 have corresponding PN generators that may be implemented, for example, using respective linear-feedback shift registers. The corresponding PN generators 226 and 276 may be operate using a common seed value at the start of the cryptographic key creation mode. Thus both PN generators 226 and 276 produce the same sequence of pseudorandom numbers. When each optical transceiver 210 or 250 determines that a new power level is to be used (e.g., after a predetermined number of samples have been transmitted and/or received), the optical transceiver may obtain the next pseudorandom number from the generator 226 or 276. The optical transceiver 250 uses the pseudorandom number to determine the power level of the continuous wave beam to provide to optical transceiver 210 based on the current pseudorandom number (e.g., based on the two or three most significant bits (MSBs) of the pseudorandom number). The optical transceiver 210, in turn, knows the power level of the beam received via the optical channel 230 based on the same MSBs of the pseudorandom number produced by the PN generator 226.

The selection of quantized samples having magnitudes greater than a threshold at block 328 may be implemented by filtering the quantized samples provided by the sampler/ADC 208 to eliminate samples having values less than a threshold. Block 328 may interact with block 324 such that the threshold used may change as the power level of the received beam changes. Alternatively, the threshold may stay the same regardless of the power level of the received beam.

At block 324, the process 320 optionally determines the new power level of the signal being received from the optical transceiver 250. The received signal is sampled and quantized to generate N quantized samples, in block 326. As described above, the ADC used in the sampler/ADC 208 may generate 16-bit digitized sample values. The ADC of the sampler/ADC 208 (not separately shown) may produce linearly quantized samples or non-linearly quantized samples in which more quantization levels are assigned to higher-valued samples.

When the process 320 includes optional block 328, the N quantized samples may be processed to select only quantized samples having values greater than a threshold or to select only the more significant bits of the quantized sample values to provide output symbol values. The threshold may be a fixed value, or, when the process includes optional block 324, the threshold may change with changes in the power level. The thresholding may be achieved, for example, by selecting only certain bits of the digitized sample values. In one example, each digitized sample values has I bits and the thresholding selects the K most significant bits (MSBs) of each digitized value to form K bit symbols. Where the range of values occupied by the digitized sample values is such that J MSBs are expected to be zero, the thresholding may include deleting the J MSBs of each digitized sample value before selecting the K MSBs. For example, when the at a low power level in which the photodetector 206 produces electrical signals in a range from 0 to 2 V and the sampler/ADC 208 produces 16-bit digitized values (I=16) having a range from 0 to 16 V, block 328 may delete the three MSBs (J=3) and the three least significant bits (LSBs) to provide 10 bit symbol values (K=10).

At higher power levels, for example when the photodetector 206 produces electrical signals in a range from 0 to 16 V, block 328 may delete the six LSBs of each sample to still produce 10-bit symbols. At block 330, the process 320 determines whether M symbols have been obtained. If they have not, process 320 transfers control to block 324 or 326 to obtain N more quantized samples. When M symbols have been obtained at block 330, block 332 creates the cryptographic key from the M symbols.

The numbers N and M depend on the desired size of the cryptographic key which, in turn, depends on the amount of data to be encrypted. For example, to create a 1024 bit cryptographic key the process 320 may need to generate 103 10-bit symbols from the quantized samples. In the example shown in FIG. 3B, N may have a value of 10 or more and M may have a value of 110 so that at least 11 iterations through the loop of the process 320 produce the desired number of symbols. In another embodiment, the sample size may be 10 bits, N may be 1 and M may be 13, for example, to create a 128 bit DES encryption key.

Figure 3C:
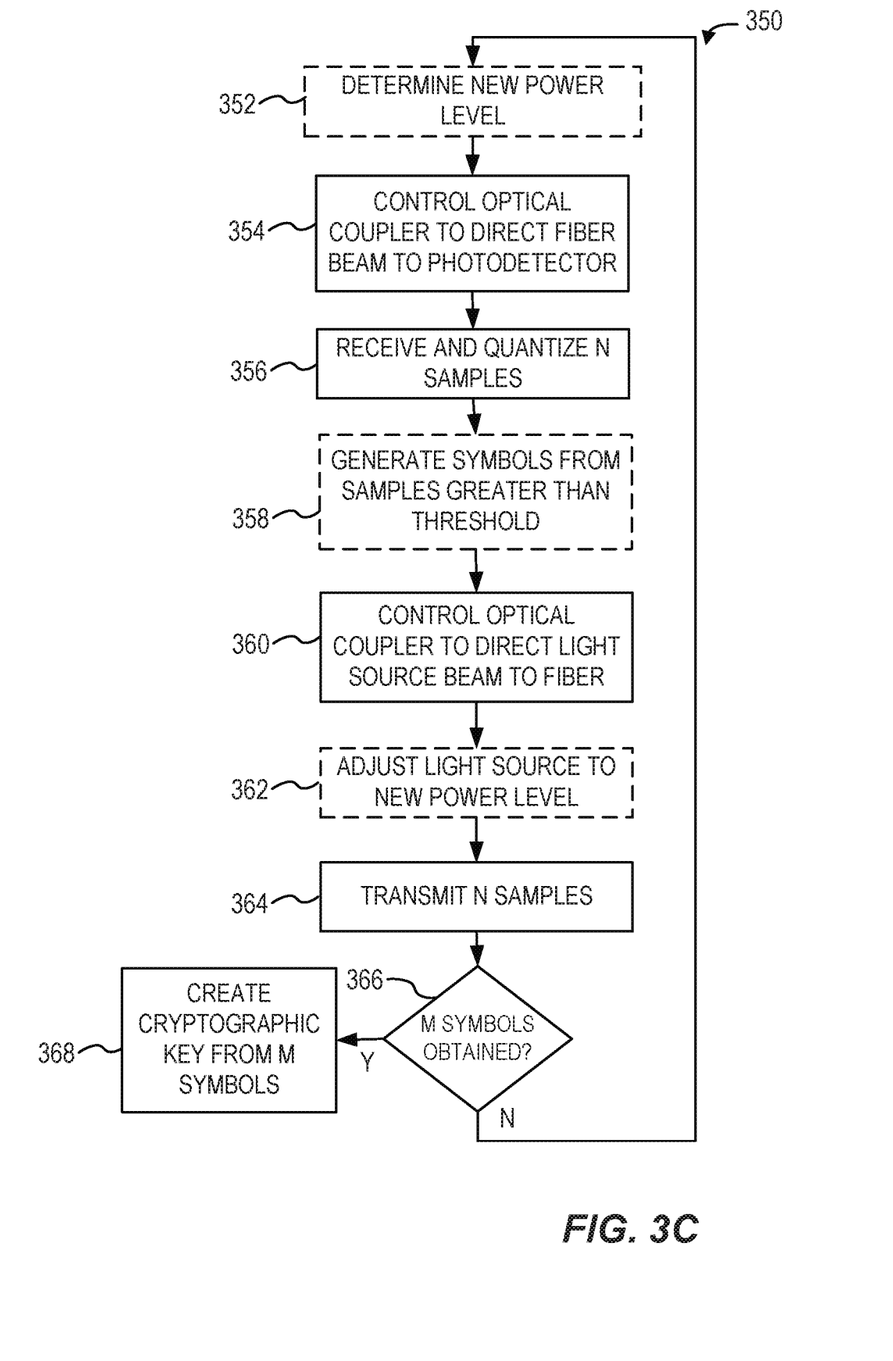

FIG. 3C is a flowchart diagram showing an example process 350 performed by the optical transceiver 210 in which both of the optical transceivers 210 and 250 concurrently create cryptographic keys. Using this process, the optical transceivers 210 and 250 alternately send and receive continuous wave signals during respective first and second optical frame times. At block 352, the optical transceiver 210 determines the new power level, for example, based on the two or three MSBs of the next pseudorandom number from the PN generator 226. At block 354, the processor 212 of the optical transceiver 210 controls the optical coupler 204 to direct the beam from the optical channel to the photodetector 206. The sampler/ADC 208 then generates N quantized samples during the time that the beam from the optical channel 230 is directed to the photodetector 206. In block 358, the processor 212 optionally selects quantized samples based on their relationship to a threshold.

After block 358, the system shown in FIG. 2 switches to the creation of the cryptographic key by the optical transceiver 250. At block 360 the processor 212 controls the optical coupler 204 to direct the beam 222 from the light source 220 to direct the beam 222 to the optical channel 230. At block 362, the processor may also control the light source 220 to provide the light beam 222 at the power level determined in block 352. Following block 360 and optionally block 362 the processor 212, in block 364, activates the light source 222 to transmit the continuous wave optical signal to the optical channel 230 for a time sufficient for the optical transceiver 250 to generate N quantized samples. During this time, the optical transceiver 250 performs the operations described above with reference to blocks 352 to 358 to generate N quantized sample values. The process continues with each of the optical transceivers 210 and 250 alternately generating N quantized sample values and converting the sample values to symbols until each of the optical transceiver 210 and 250 has obtained M symbols. Until M symbols have been obtained at block 366, the process 350 branches to block 352 or block 354 to allow the optical transceivers 210 and 250 to each obtain the next N quantized samples. When M symbols have been obtained at block 366, the process 350 executes block 368 to generate the encryption key from the M symbols.

Figure 4A:
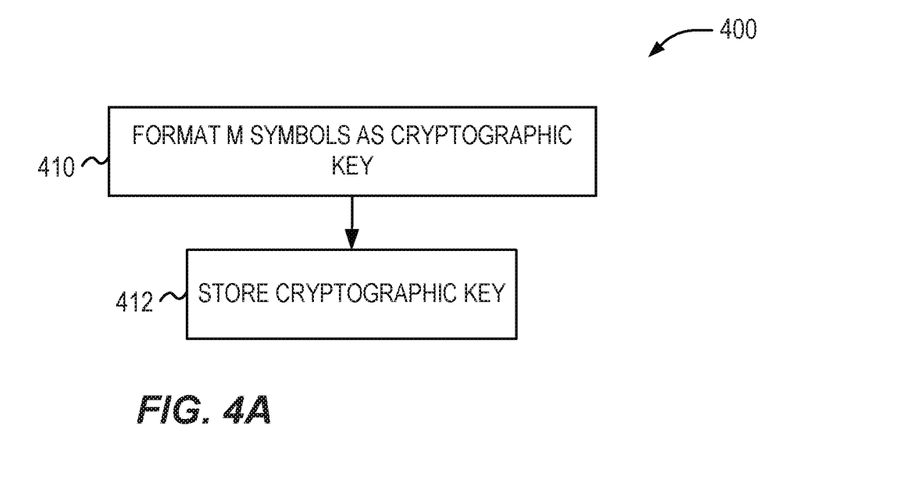
FIGS. 4A and 4B are flow-chart diagrams showing methods for generating an encryption key from a set of M symbols.

FIG. 4A is a flowchart diagram showing an example process 400 which the encryption key is created directly from the M symbols generated as described above with reference to FIGS. 3A and 3B. At block 410, the process 400 formats the M symbols as the cryptographic key. This may entail concatenating the binary values represented by the M symbols and deleting binary bits to achieve the desired key length. For example, when the desired encryption key is a 128 bit DES key, the block 410 may concatenate 13 10-bit symbols and delete the last two bits of the concatenated result to produce the 128 bit key. To ensure that same key is created by both of the optical transceivers 210 and 250, it is desirable to use a common method for processing the M symbols to produce the encryption key. At block 412, the process 400 stores the encryption key into the memory 214 or 264.

Figure 4B:
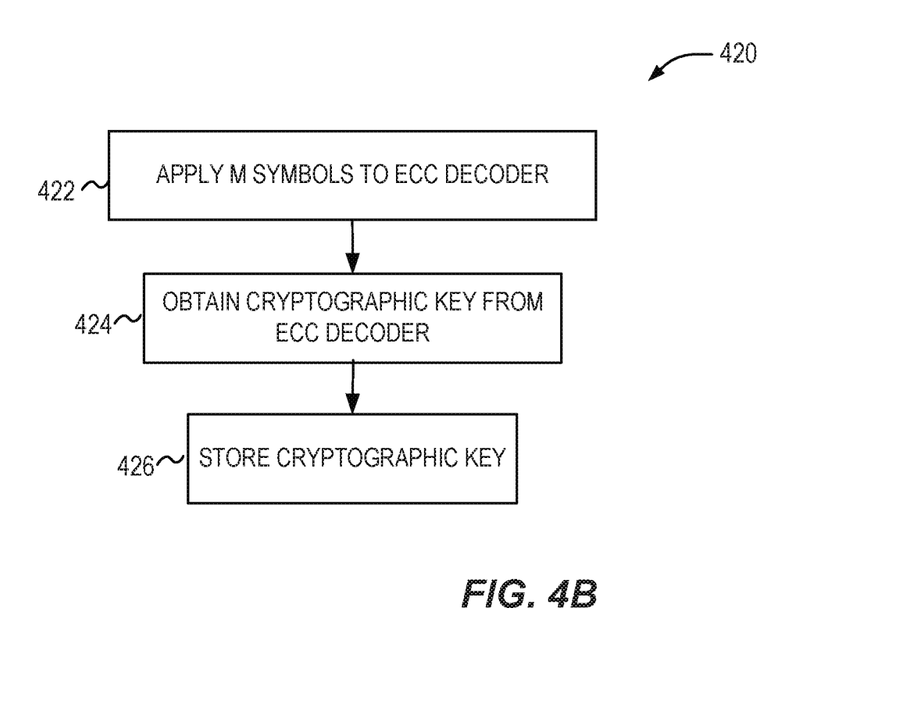

FIG. 4B is a flowchart diagram showing an alternative process 420 that uses an ECC decoder to create the cryptographic key. At block 422, the processor 212 or 262 concatenates the M symbols generated as described above with reference to FIGS. 3A and 3B and applies the resultant value to the ECC decoder. In example embodiments, the ECC decoder may be a Reed-Solomon decoder implemented in software by the optical transceivers 210 and 250. As described above, the ECC decoder may implement a many to one mapping in which one of a set of encryption keys is provided responsive to each of several concatenated sample values. The mapping may project concatenated symbol values onto a cryptographic key where concatenated symbol values differ from the cryptographic key in, for example, 1, 2, 3, or more bit positions. After obtaining the cryptographic key at block 424, the process 420 stores the cryptographic key into the memory 214 or 264.

Figure 5:
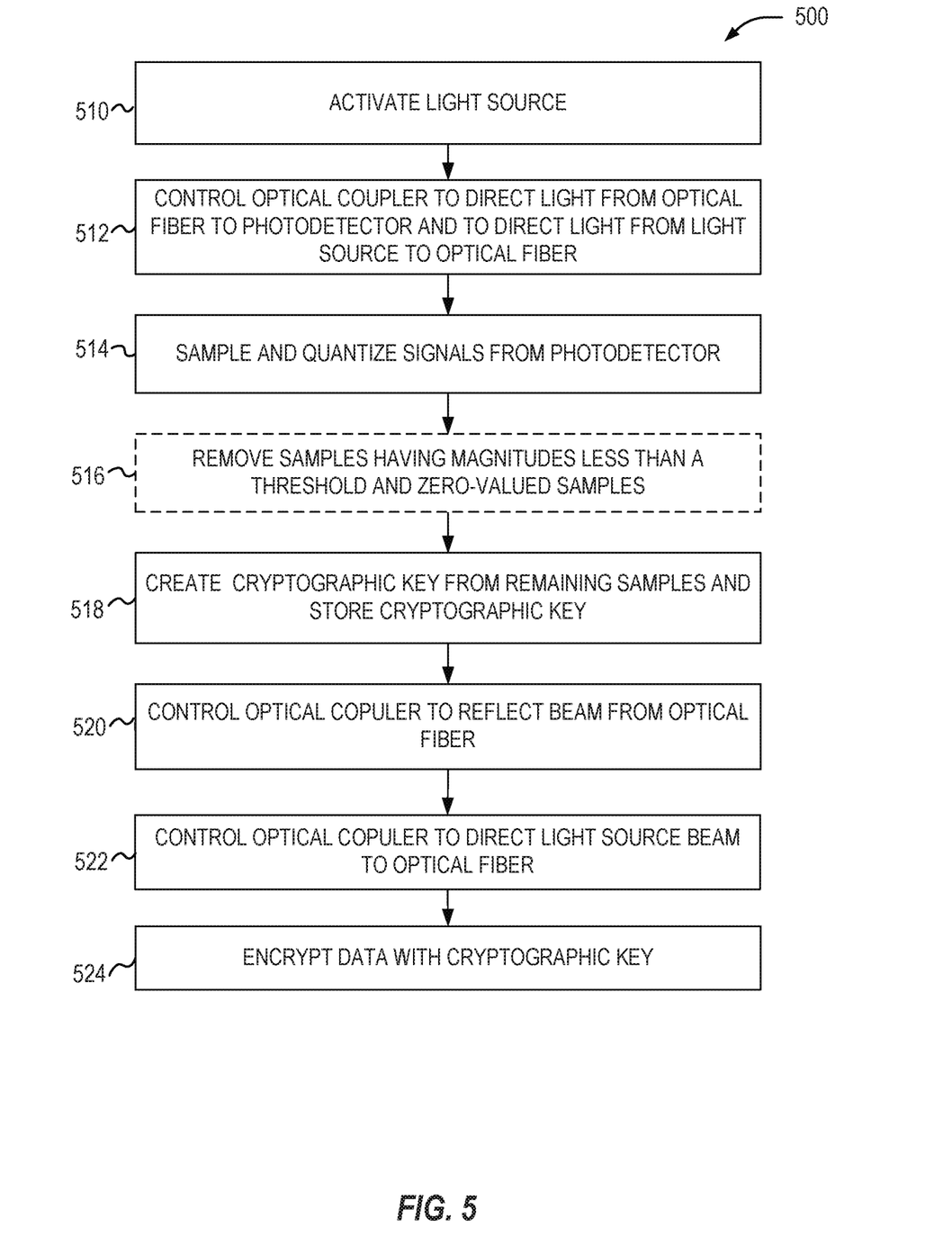
FIG. 5 is a flow-chart diagram showing the operation of another example key generator that may be used in the network shown in FIG. 1B.

The embodiments described above operate in a network configuration such as that shown in FIG. 1A in which a first optical transceiver 102 is coupled to a second optical transceiver 104 via an optical channel 106 that uses a single optical channel. When, as shown in FIG. 1B, there are one or more repeaters 158, 162 in the optical channel between the first and second optical transceivers 152 and 154, it may be more difficult to achieve a reciprocal channel between the first optical transceiver 152 and second optical transceiver 154. FIG. 5 is a flowchart diagram describing a cryptographic key creation process 500 that may be used in networks such as that shown in FIG. 1B. The process 500 uses the channel 164 between the first and second optical transceivers 152 and 154 as a full-duplex channel that concurrently transmits optical signals in both directions. In this process, light signals sent from the first optical transceiver 152 are reflected by the second optical transceiver 154 and then sampled and digitized at the first optical transceiver 152 in order to create the cryptographic key used by the first optical transceiver 152. Similarly, light signal sent from the second optical transceiver 154 are reflected by the first optical transceiver 152 and then sampled and digitized at the second optical transceiver 154 to create the corresponding cryptographic key used by the second optical transceiver 154. Although not shown in FIG. 5, it is contemplated that the process 500 may use beams having different power levels and may interleave the transmitting and sampling of the optical signals by the first transceiver 154 with the transmitting and sampling of the optical signals at the second transceiver 156.

FIG. 5 is described in terms of the optical transceivers 210 and 250, shown in FIG. 2 for the description of FIG. 5, it is assumed that the optical channel 230 between the transceivers 210 and 250 includes one or more repeaters (not shown in FIG. 2). With respect to the transceiver 210, prior to initiating the process 500, the optical coupler 254 of the optical transceiver 250 is configured to direct light from the optical channel 230 to the mirror element 274. At block 510, the process 500 then activates the light source 220 and, at block 512, controls the optical coupler 204 to direct light from the optical channel 230 to the photodetector 206 and simultaneously to direct the beam 222 from the light source 220 to the optical channel 230. This results in the beam 222 traversing the optical channel 230 being reflected by the mirror element 274 of the transceiver 250 and then being received and directed to the photodetector 206 of the optical transceiver 210.

At block 514, optical signals incident on the photodetector 206 are sampled and quantized by the sampler/ADC 208, as described above, and the resultant quantized samples provided to the processor 212. The processor may filter the samples, at block 516, to remove quantized samples having magnitudes less than a threshold, for example by deleting less significant bits of the samples and possibly more significant bits of the samples, as described above, to generate symbols corresponding to the quantized samples. Also as described above, the process 500 may delete zero valued symbols. At block 518, the process 500 may then create and store the cryptographic key from the accumulated samples as described above with reference to FIGS. 3A through 4B. At block 520, after generating and storing the cryptographic key, the optical transceiver 210 may control the optical coupler 204 to direct and the optical channel 230 to the mirror element 224. The optical transceiver 210 may then maintain this configuration for an amount of time sufficient for the optical transceiver 250 to create its cryptographic key.

At block 522, the optical transceiver 210 then controls the optical coupler 204 to direct the beam 222 to the optical channel 230 and, at block 254 encrypts and transmits a known data set to the optical transceiver 250 using the created encryption key. The known data set may be part of the protocol between the optical transceivers 210 and 250. It is used, as described below, to determine whether the cryptographic keys of the two optical transceivers 210 and 250 match. As described above, the optical transceiver 210 may then wait to receive an acknowledgment or may receive the encrypted known data set from the optical transceiver 250. When the optical transceiver 210 does not receive the acknowledgment or cannot decrypt the known data set, it may restart the process 500 to create another cryptographic key.

Figure 6A:
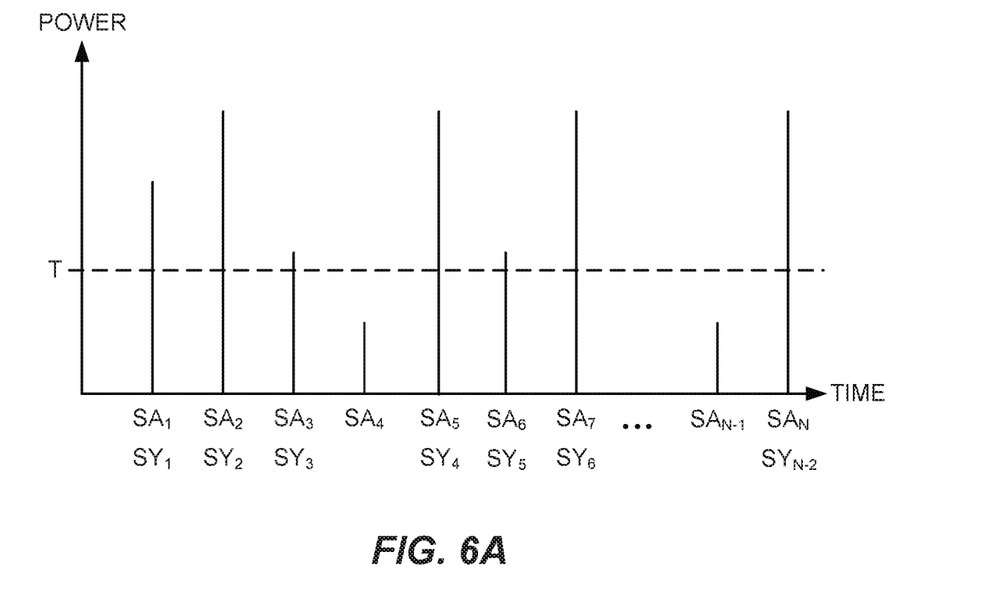
FIGS. 6A and 6B are graphs of power versus time that are useful for describing example embodiments.
Figure 6B:
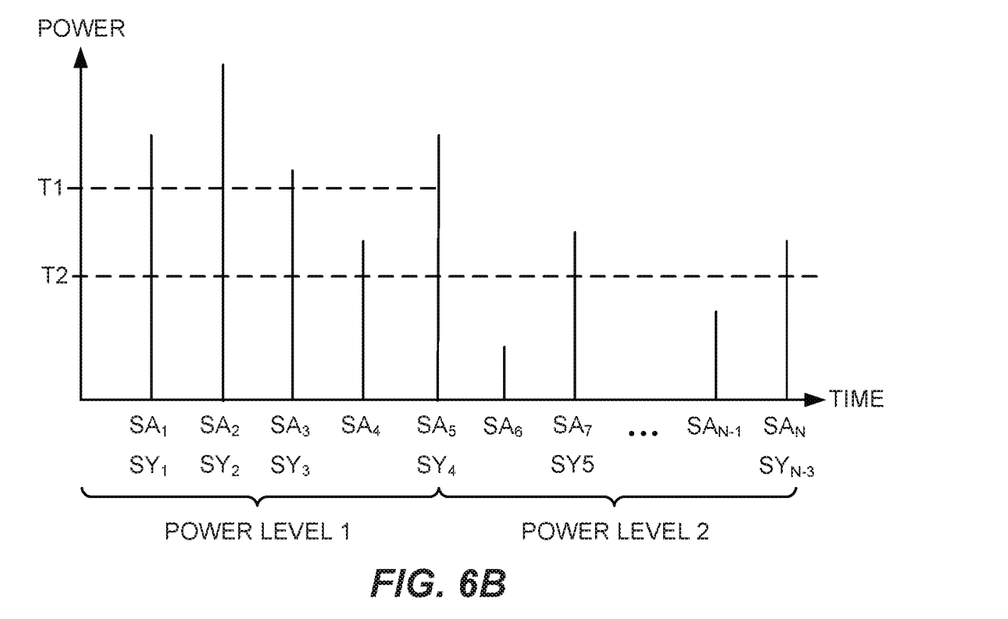

FIGS. 6A and 6B are graphs of signal power versus time showing sampling operations performed in the example optical transceivers 210 and 250. FIGS. 6A and 6B show example sampling of respective optical signal received at transceiver 210 of FIG. 2. $SA_1$, $SA_2$, $SA_3$, $SA_4$, $SA_5$, $SA_6$, $SA_7$, ..., $SA_{N-1}$, and $SA_N$ are quantized samples generated by sampler/ADC 208 at intervals of time that are shown along the horizontal time axis. The labels $SY_1$, $SY_2$, $SY_3$, $SY_4$, $SY_5$, $SY_6$, and $SY_{N-2}$ below the respective samples $SA_1$, $SA_2$, $SA_3$, $SA_5$, $SA_6$, ..., and $SA_N$ indicate the respective N-2 symbols generated from the N quantized samples. As described above, in one example, the quantized samples may be 16-bit values while the symbols may be 10-bit values derived from respective ones of the quantized samples.

Each quantized sample is a bit string that indicates the value of a sampled optical power level indicated by the height of the quantized sample as shown by the vertical power axis. As described above, the power level is related to the number of photons incident on the photodetector 206 during the integration interval (e.g., 1 ns to 50 ns). The relative heights of the quantized samples is exaggerated in FIGS. 6A and 6B to illustrate operation of the embodiment. Alternatively, the relative heights of the quantized samples may represent the ADC of the sampler/ADC 208 implementing a non-linear transfer function that assigns more quantization levels to higher power levels than to lower power levels, enhancing differences among the higher power samples while reducing differences among lower power samples.

In the scenario shown in FIG. 6A, the sampler/ADC 208 of the optical transceiver 210 receives an optical signal transmitted by the optical transceiver 250 at a single power level. The horizontal line T represents a threshold value. As described above, the transceivers may ignore the quantized samples having values less than the threshold T when generating the output symbols used to create the cryptographic key. As shown in FIG. 6A, samples $SA_4$ and $SA_{N-1}$ have values less than the threshold T and are ignored so that the processor 212 of the optical transceiver 210 generates symbols $SY_1$, $SY_2$, $SY_3$, $SY_4$, $SY_5$, $SY_6$, and $SY_{N-2}$, corresponding to the respective samples, $SA_1$, $SA_2$, $SA_3$, $SA_5$, $SA_6$, $SA_7$ and $SA_N$.

The scenario shown in FIG. 6B illustrates an example in which the power level of the continuous wave optical signal provided by the optical transceiver 250 changes between power level 1 and power level 2. Quantized samples $SA_1$, $SA_2$, $SA_3$, and $SA_4$ represent samples received at power level 1 while samples $SA_5$, $SA_7$, ..., $SA_{N-1}$, and $SA_N$ represent samples received at power level 2, where power level 2 is lower than power level 1. The embodiment illustrated by FIG. 6B shows two threshold values, T1 and T2. In this embodiment, T1 is used for quantized samples $SA_1$, $SA_2$, $SA_3$, and $SA_4$ while T2 is used for quantized samples $SA_5$, $SA_6$, $SA_7$, ..., $SA_{N-1}$, and $SA_N$. As shown in FIG. 6B, quantized sample $SA_4$ is less than T1 and quantized samples $SA_6$ and $SA_{N-1}$ are less than T2. Accordingly, these samples are ignored and no corresponding symbols are generated. Thus, in the scenario shown in FIG. 6B, the processor 212 of the optical transceiver 210 generates N-3 symbols $SY_1$, $SY_2$, $SY_3$, $SY_4$, $SY_5$, ..., and $SY_{N-3}$ from the N quantized samples $SA_1$, $SA_2$, $SA_3$, $SA_4$, $SA_5$, $SA_6$, $SA_7$, ..., $SA_{N-1}$, and $SA_N$. As described above, when generating the symbols from the quantized samples, the processor 212 may subtract the threshold value from the quantized samples (e.g., delete the LSBs corresponding to the threshold). Furthermore, the processor 212 may delete the MSBs of the quantized symbols that are expected to be zero-valued based on the current power level.

The example embodiments disclosed herein may be described in the general context of processor-executable code or instructions stored on memory that may comprise one or more computer readable storage media (e.g., tangible non-transitory computer-readable storage media such as memory 214 or 264). As should be readily understood, the terms "computer-readable storage media" or "non-transitory computer-readable media" include the media for storing of data, code and program instructions, such as memory 214, 264, and do not include portions of the media for storing transitory propagated or modulated data communication signals.

Examples

Example 1 is a cryptographic key generator for a first optical transceiver comprising: a photodetector configured to receive a first light beam from an optical channel; a memory including program instructions; a processor coupled to the memory and the photodetector, the processor being configured by the program instructions to: receive signals from the photodetector in response to the first light beam; sample the signals from the photodetector during a first plurality of intervals to generate respective samples representing respective numbers of photons incident on the photodetector during each interval of the first plurality of intervals; quantize the samples to generate a plurality of digital values; and create the cryptographic key from the plurality of digital values.

In Example 2, the subject matter of Example 1 includes, wherein the program instructions configure the processor to select ones of the plurality of digital values having magnitudes greater than a threshold value for creation of the cryptographic key.

In Example 3, the subject matter of Examples 1-2 includes, wherein the digital values are I-bit digital values, where I is an integer, and program instructions configure the processor to: select K bits of each of the I-bit digital values, where K is an integer less than I, to generate a plurality of K-bit symbols; delete ones of the K-bit symbols having values of zero to provide a set of non-zero valued K-bit symbols; and concatenate the non-zero valued K-bit symbols to create the cryptographic key.

In Example 4, the subject matter of Example 3 includes, wherein program instructions configure the processor to: apply the concatenated value to an error correction code (ECC) decoder to generate an output value; and store the output value as the cryptographic key in the memory.

In Example 5, the subject matter of Examples 3-4 includes, wherein the K bits are the K most significant bits (MSBs) of the I-bit digital values.

In Example 6, the subject matter of Examples 3-5 includes, wherein the I-bit digital values are expected to have a range of values such that each I-bit digital value has J zero-valued most significant bits (MSBs), where J is an integer less than I and J+K is less than I, and the program instructions cause the processor to: delete the J MSBs of each of the I-bit values to form I-J-bit digital values; and select the K MSBs of the each of the I-J-bit digital values to generate the K-bit symbols.

In Example 7, the subject matter of Examples 1-6 includes, wherein the first light beam is a continuous wave light beam.

In Example 8, the subject matter of Examples 1-7 includes, wherein the first light beam has respectively different power levels during predetermined intervals of the first plurality of intervals and the program instructions configure the processor to: select respective thresholds for use during each of the predetermined intervals; select ones of the plurality of digital values having magnitudes greater than the selected threshold value during each predetermined interval; and create the cryptographic key from the selected digital values.

In Example 9, the subject matter of Examples 1-8 includes, wherein: the first optical transceiver further comprises: a light source configured to produce a second light beam; and an optical coupler configured to selectively direct the second light beam from the light source to the optical channel and to direct the first light beam from the optical channel to the photodetector; and the program instructions further configure the processor of the cryptographic key generator to control the optical coupler and the light source to: direct the first light beam from the optical channel to the photodetector during the first plurality of intervals; and direct the second light beam from the light source to the optical channel during a second plurality of intervals, different from the first plurality of intervals.

In Example 10, the subject matter of Example 9 includes, wherein the second plurality of intervals occurs after the first plurality of intervals.

In Example 11, the subject matter of Examples 9-10 includes, wherein the second plurality of intervals is interleaved with the first plurality of intervals.

In Example 12, the subject matter of Examples 9-11 includes, wherein: the first plurality of intervals occurs during a first optical frame time and the second plurality of intervals occurs during a second optical frame time; and the program instructions further configure the processor to: encrypt data to be transmitted via the optical channel using the created cryptographic key; control the light source to modulate the second light beam according to the encrypted data during a third interval different from the first and second and optical frame times; control the optical coupler to direct the second light beam to the optical channel during the third interval and to direct the first light beam from the optical channel to the photodetector during a fourth interval, different from the third interval and the first and second optical frame times; and decrypt the digital values generated by the processor in response to the second light beam being incident on the photodetector during the fourth interval using the cryptographic key.

In Example 13, the subject matter of Examples 1-12 includes, a light source configured to generate a second light beam; a reflecting element; and an optical coupler configured to: selectively direct the first light beam from the optical channel to the reflecting element or to direct the first light beam to the photodetector, and to direct the second light beam to the optical channel; wherein the instructions further configure the processor to control the optical coupler and the light source to: direct the second light beam to the optical channel and direct the first light beam to the photodetector during the first plurality of intervals; and direct the first light beam to the reflecting element during a second plurality of intervals, different from the first plurality of intervals.

Example 14 is a method for generating a cryptographic key in an optical transceiver, the method comprising: receiving signals from a photodetector of the optical transceiver in response to a light beam being incident on the photodetector; sampling the signals from the photodetector during a plurality of intervals to generate respective samples representing respective numbers of photons incident on the photodetector during the each interval of the plurality of intervals; quantizing the samples to generate a plurality of digital values; and creating the cryptographic key from the plurality of digital values.

In Example 15, the subject matter of Example 14 includes, selecting ones of the plurality of digital values having magnitudes greater than a threshold value for creation of the cryptographic key.

In Example 16, the subject matter of Example 15 includes, concatenating the selected ones of the plurality of digital values and applying the concatenated value to an error correction code (ECC) decoder to create the cryptographic key.

In Example 17, the subject matter of Examples 14-16 includes, wherein the light beam is a continuous wave light beam.

In Example 18, the subject matter of Examples 14-17 includes, wherein the light beam has respectively different power levels during predetermined intervals of the plurality of intervals and the method further comprises: selecting respective thresholds for use during each predetermined interval; and generating the cryptographic key comprises selecting ones of the plurality of digital values having magnitudes greater than the selected threshold value during each predetermined interval.

Example 19 is apparatus for generating a cryptographic code in an optical transceiver comprising: means for receiving a plurality of signals representing respective numbers of photons of a light beam received by the optical transceiver during each of a plurality of intervals; means for generating respective digital values representing the received plurality of signals; means for selecting ones of the plurality of digital values having magnitudes greater than a threshold value; and means for generating the cryptographic key from the selected ones of the plurality of digital values.

In Example 20, the subject matter of Example 19 includes, wherein the light beam has respectively different power levels during predetermined intervals of the plurality of intervals and the apparatus further comprises: means for selecting respective thresholds for use during each predetermined interval; and the means for generating the cryptographic key comprises means for selecting ones of the plurality of digital values having magnitudes greater than the selected threshold value during each predetermined interval.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the scope of the appended claims.

In particular and in regard to the various functions performed by the above described components, devices, circuits, systems and the like, the terms used to describe such components are intended to correspond, unless otherwise indicated, to any component which performs the specified function of the described component, e.g., a functional equivalent, even though not structurally equivalent to the disclosed structure, which performs the function in the example illustrated aspects of the claimed subject matter. In this regard, it will also be recognized that the disclosed example embodiments and implementations include a system as well as computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned example systems have been described with respect to interaction among several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

Furthermore, while a particular feature of the claimed subject matter may have been disclosed with respect to one of several implementations, such feature may be combined with one or more other features of the other implementations as may be desired and advantageous for any given or particular application. In addition, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A cryptographic key generator for a first optical transceiver comprising:
    a photodetector configured to receive a first unmodulated light beam from an optical channel;
    a memory including program instructions;
    a processor coupled to the memory and the photodetector, the processor being configured by the program instructions to:
    receive signals from the photodetector in response to the light beam;
    sample the signals from the photodetector during a first plurality of intervals to generate respective samples representing respective numbers of photons incident on the photodetector during each interval of the first plurality of intervals, wherein characteristics of the optical channel result in variations among the respective samples;
    quantize the samples to generate a plurality of digital values; and
    create the cryptographic key from the plurality of digital values.

2. The cryptographic key generator of claim 1, wherein the program instructions configure the processor to select ones of the plurality of digital values having magnitudes greater than a threshold value for creation of the cryptographic key.

3. The cryptographic key generator of claim 1, wherein the digital values are I-bit digital values, where I is an integer, and program instructions configure the processor to:
    select K bits of each of the I-bit digital values, where K is an integer less than I, to generate a plurality of K-bit symbols;
    delete ones of the K-bit symbols having values of zero to provide a set of non-zero valued K-bit symbols; and
    concatenate the non-zero valued K-bit symbols to create the cryptographic key.

4. The cryptographic key generator of claim 3, wherein program instructions configure the processor to:
    apply the concatenated value to an error correction code (ECC) decoder to generate an output value; and
    store the output value as the cryptographic key in the memory.

5. The cryptographic key generator of claim 3, wherein the K bits are the K most significant bits (MSBs) of the I-bit digital values.

6. The cryptographic key generator of claim 3, wherein the I-bit digital values are expected to have a range of values such that each I-bit digital value has J zero-valued most significant bits (MSBs), where J is an integer less than I and J+K is less than I, and the program instructions cause the processor to:
    delete the J MSBs of each of the I-bit values to form I-J-bit digital values; and
    select the K MSBs of the each of the I-J-bit digital values to generate the K-bit symbols.

7. The cryptographic key generator of claim 1, wherein the first unmodulated light beam is a continuous wave light beam.

8. The cryptographic key generator of claim 1, further wherein the first unmodulated light beam has respectively different power levels during predetermined intervals of the first plurality of intervals and is unmodulated during each of the predetermined intervals and the program instructions configure the processor to:
- select respective thresholds for use during each of the predetermined intervals;
- select ones of the plurality of digital values having magnitudes greater than the selected threshold value during each predetermined interval; and
- create the cryptographic key from the selected digital values.

9. The cryptographic key generator of claim 1, wherein:
the first optical transceiver further comprises:
- a light source configured to produce a second unmodulated light beam; and
- an optical coupler configured to selectively direct the second unmodulated light beam from the light source to the optical channel and to direct the first unmodulated light beam from the optical channel to the photodetector; and
- the program instructions further configure the processor of the cryptographic key generator to control the optical coupler and the light source to:
- direct the first unmodulated light beam from the optical channel to the photodetector during the first plurality of intervals; and
- direct the second unmodulated light beam from the light source to the optical channel during a second plurality of intervals, different from the first plurality of intervals.

10. The cryptographic key generator of claim 9, wherein the second plurality of intervals occurs after the first plurality of intervals.

11. The cryptographic key generator of claim 9, wherein the second plurality of intervals is interleaved with the first plurality of intervals.

12. The cryptographic key generator of claim 9, wherein:
the first plurality of intervals occurs during a first optical frame time and the second plurality of intervals occurs during a second optical frame time; and
the program instructions further configure the processor to:
- encrypt data to be transmitted via the optical channel using the created cryptographic key;
- control the light source to modulate the second unmodulated light beam according to the encrypted data during a third interval different from the first and second and optical frame times to produce a second modulated light beam;
- control the optical coupler to direct the second modulated light beam to the optical channel during the third interval and to direct a first modulated light beam from the optical channel to the photodetector during a fourth interval, different from the third interval and the first and second optical frame times; and
- decrypt the digital values generated by the processor in response to the first modulated light beam being incident on the photodetector during the fourth interval using the cryptographic key.

13. The cryptographic key generator of claim 1, further comprising:
- a light source configured to generate a second unmodulated light beam;
- a reflecting element; and
- an optical coupler configured to:
- selectively direct the first unmodulated light beam from the optical channel to the reflecting element or to direct the first unmodulated light beam to the photodetector, and
- to selectively direct the second unmodulated light beam to the optical channel;
- wherein the instructions further configure the processor to control the optical coupler and the light source to:
- direct the second unmodulated light beam to the optical channel and direct the first unmodulated light beam to the photodetector during the first plurality of intervals; and
- direct the first unmodulated light beam to the reflecting element during a second plurality of intervals, different from the first plurality of intervals.

14. A method for generating a cryptographic key in an optical transceiver, the method comprising:
- receiving signals from a photodetector of the optical transceiver in response to an unmodulated light beam being incident on the photodetector;
- sampling the signals from the photodetector during a plurality of intervals to generate respective samples representing respective numbers of photons incident on the photodetector during the each interval of the plurality of intervals, wherein characteristics of the optical channel result in variations among the respective samples;
- quantizing the samples to generate a plurality of digital values; and
- creating the cryptographic key from the plurality of digital values.

15. The method of claim 14, further comprising selecting ones of the plurality of digital values having magnitudes greater than a threshold value for creation of the cryptographic key.

16. The method of claim 15, further comprising concatenating the selected ones of the plurality of digital values and applying the concatenated value to an error correction code (ECC) decoder to create the cryptographic key.

17. The method of claim 14, wherein the unmodulated light beam is a continuous wave light beam.

18. The method of claim 14, further wherein the unmodulated light beam has respectively different power levels during predetermined intervals of the plurality of intervals and is unmodulated during each of the predetermined intervals and the method further comprises:
- selecting respective thresholds for use during each predetermined interval; and
- generating the cryptographic key comprises selecting ones of the plurality of digital values having magnitudes greater than the selected threshold value during each predetermined interval.

19. Apparatus for generating a cryptographic code in an optical transceiver comprising:
- means for receiving a plurality of signals representing respective numbers of photons of an unmodulated light beam received by the optical transceiver from an optical channel during each of a plurality of intervals, wherein characteristics of the optical channel result in variations among the plurality of signals;
- means for generating respective digital values representing the received plurality of signals;
- means for selecting ones of the plurality of digital values having magnitudes greater than a threshold value; and
- means for generating the cryptographic key from the selected ones of the plurality of digital values.

20. The apparatus of claim 19, wherein the unmodulated light beam has respectively different power levels during predetermined intervals of the plurality of intervals and is unmodulated during each of the predetermined intervals and the apparatus further comprises:
  means for selecting respective thresholds for use during each predetermined interval; and
  the means for generating the cryptographic key comprises means for selecting ones of the plurality of digital values having magnitudes greater than the selected threshold value during each predetermined interval.

* * * * *